United States Patent [19]
Hanna

[11] Patent Number: 5,293,103
[45] Date of Patent: Mar. 8, 1994

[54] QUIET FAN SPEED CONTROL WITH LINEAR ADJUSTMENT ACTUATOR

[75] Inventor: Robert S. Hanna, Coopersburg, Pa.

[73] Assignee: Lutron Electronics Co., Inc., Coopersburg, Pa.

[21] Appl. No.: 478,604

[22] Filed: Feb. 12, 1990

[51] Int. Cl.⁵ .............................................. H02P 7/00
[52] U.S. Cl. ..................................... 318/268; 388/827
[58] Field of Search ............... 318/268, 53, 55, 66, 318/75; 200/16 R, 16 A, 16 D, 291, 222, 68 B, 11 G, 11 H, 16 C, 247, 257, 255, 260, 283, 290, 563, 324, 325; 388/825, 826, 827, 837, 838, 839

[56] References Cited

U.S. PATENT DOCUMENTS

| | | | |
|---|---|---|---|
| 2,648,808 | 8/1953 | Tiede | 318/229 |
| 2,903,633 | 9/1959 | Cother | 200/252 |
| 3,485,966 | 12/1969 | Bailey et al. | 200/291 X |
| 3,857,000 | 12/1974 | Boulanger | 200/252 X |
| 3,983,355 | 9/1976 | Hyodo | 200/16 R |
| 4,152,565 | 5/1979 | Rose | 200/16 A |
| 4,311,885 | 1/1982 | Arther | 200/16 C |
| 4,408,150 | 10/1983 | Holston et al. | 318/779 |
| 4,429,202 | 1/1984 | Tedd et al. | 200/252 X |
| 4,465,956 | 8/1984 | Fowler | 318/268 |
| 4,492,828 | 1/1985 | Martinez et al. | 200/5 R |
| 4,520,306 | 5/1985 | Kirby | 323/324 |
| 4,710,600 | 12/1987 | Sasaki et al. | 200/291 |

OTHER PUBLICATIONS

Lightolier Slide Fan Controls Brochure C. G. Veinott—*Fractional and Subfractional Horsepower Electric Motors*, Third Ed., McGraw-Hill, 1970, pp. 152–157.

*Primary Examiner*—Jonathan Wysocki
*Attorney, Agent, or Firm*—Seidel, Gonda, Lavorgna & Monaco

[57] ABSTRACT

A fan speed control adjusts the speed of an electric fan motor without producing audible noise at frequencies above about 60 Hz. A linear slide switch is positionable in each of four discrete positions to connect various capacitances in series with the motor to limit the power provided to the motor from an ac source. An actuator engaging the slide switch includes detents to urge the switch into each of the four positions. The urging force is a maximum approximately half-way between adjacent positions and decreases linearly to a minimum at each position. The maximum force necessary to move the switch from one position to the next is not greater than about 0.8 lb., to avoid overshoot when the actuator is operated by an extended arm.

15 Claims, 5 Drawing Sheets

QUIET FAN SPEED CONTROL WITH LINEAR ADJUSTMENT ACTUATOR

BACKGROUND OF THE INVENTION

1. Field of the Invention

This invention relates to fan speed controls and, more particularly, to a linear actuator system for adjusting the setting of a fan speed control.

2. Description of the Related Art

Controlling the speed of a fan, of the type used for cooling, circulating, or exhausting air, is often desirable. Varying fan speed can accommodate changing conditions of temperature and humidity and can conserve energy. Fan motor controls have, for a long time, varied fan speed by using switches that connect various portions of the motor armature to a power source. This requires, however, that the motor armature have multiple windings and/or multiple taps, which increases the cost of the motor and decreases its reliability. The mechanism used to switch between the different windings is typically located on or near the motor housing. This can be inconvenient if, for instance, the fan is mounted on a high ceiling, out of reach. For these reasons, it is desirable to provide an external device, which is easily mounted on a wall, to regulate the speed of a fan motor.

Light dimmers have been adapted to control fan speed by controlling the flow of power from an ac source to the fan motor. See, for example, U.S. Pat. No. 4,520,306, issued May 28, 1985 to Kirby, incorporated herein by reference. Kirby discloses a phase control device that incorporates a power semiconductor switch, which alternately connects and disconnects power to the fan motor in each half cycle of power flow from the source. The fan speed is varied by controlling the period of time during which the motor is connected to the source. A drawback of these phase-control devices is that the semiconductor-switched waveform provided to the motor tends to produce audible high-frequency noise.

More recent fan speed controls use circuitry having no semiconductor switches. (See U.S. Pat. No. 4,408,150, issued Oct. 4, 1983 to Holston et al.) These "quiet" fan speed controls provide several selectable impedances - typically capacitors - in series with the motor armature to provide various reduced levels of smooth (i.e., not switched) power to the motor from an ac source. The power reduction is proportional to the series impedance. The De-Hummer Fan Speed Control, manufactured by Power Controls, San Antonio, Tex., is a wall-mountable device operated by a rotatable switch and actuator. The switch can be positioned to select among four capacitance values, providing four discrete speed settings and a power off setting.

A drawback of rotatable switches is that they do not provide a quickly-discernible indication of their setting, since the rotation has no inherent starting or ending point. A linearly actuable switch overcomes this drawback, since the relative speed setting is easily determined from the position of the actuator relative to its end of travel points.

Conventional linearly actuated switches are designed to be operated by one or two fingers moving relative to a hand that is fixed within a local frame of reference. They are not well adapted for wall-mounted use, where an entire arm may be used to actuate the switch. Specifically, the force required to move the switch from one position to the next typically results in overshoot, due to the feedback control characteristics of the human arm-/muscle system, which quickly pushes the actuator past the desired position. This makes a wall-mounted linear switch difficult to use.

The Sunrise Whispurr fan speed control, manufactured by Lightolier Controls, Secaucus, N.J., includes a four-position linear slide switch for selecting among three speed settings and "off." The control requires a large actuation force (between about 1.5 and 2 lb.) to move the slide switch actuator from one position to the next. In addition, the actuator can be set between adjacent positions so that the switch becomes inoperative and power is removed from the fan motor.

SUMMARY OF THE INVENTION

The present invention provides a linear switch and actuator for changing the electrical characteristics of a circuit, such as a quiet fan speed control, having a maximum actuation force no larger than about 0.8 lb. and having a sliding motion characterized by a series of "detention steps" that urge the actuator into one of a number of discrete switch positions.

A multi-pole, multi-throw, linear slide switch is provided that is capable of switching up to about three (3) amperes (3A). Switch wipers mounted in a wiper assembly slidably contact conductive terminals in each position with a force no greater than about 0.2 lb., so that the maximum force required to move the wiper assembly is less than about 0.2 lb. An actuator engages the wiper assembly to move it from one position to the next. Cantilevered flexible members extend from the actuator and engage adjacent corrugated surfaces to provide a characteristic force on the actuator that is a maximum approximately half-way between discrete switch positions and that decreases linearly to a minimum at each discrete position.

A four-speed quiet fan speed control, adjustable with the switch and actuator described above, includes two capacitors of equal value that can be switched in series with an electric motor to reduce power flow from an ac source. The fan speed control has four selectable speed settings and a separate switch to turn power to the motor on and off. Alternatively, a three-speed control disconnects power from the motor when the switch actuator is in its lowest setting, so that the fan speed control has three selectable speed settings and off. A separate switch turns power on and off to an auxiliary load, such as a nearby light source.

Both quiet fan speed controls are adapted to be mounted in a wallbox and to selectively control the speed of an electric fan motor so that it emits substantially no audible noise at frequencies higher than about 60 Hz.

In one embodiment of the present invention, an apparatus for manually adjusting electrical characteristics of a circuit comprises:

a) a support housing;
b) variable means disposed within said support housing for setting said electrical characteristics of said circuit; and
c) an actuator assembly, including a linearly movable actuator, slidably mounted on said support housing and positionable, by an applied force, in a plurality of discrete positions to adjust said variable setting means, the magnitude of said force being a maximum approximately half-way between adjacent positions and decreasing substantially linearly to a minimum at each of said positions;

whereby sliding motion of said actuator is characterized by a plurality of detention steps that urge said actuator into each of said positions.

In another embodiment of the present invention, an apparatus for manually adjusting electrical characteristics of a circuit comprises:
 a) a support housing;
 b) variable means disposed within said support housing for setting said electrical characteristics of said circuit;
 c) a linearly movable actuator slidably mounted on said support housing and positionable, by an applied force, in a plurality of discrete positions to adjust said variable setting means; and
 d) detent means mechanically engaging said actuator to urge said actuator into each of said positions, said detent means exerting on said actuator a maximum force of less than about 0.8 lb.

In another embodiment of the present invention, an apparatus for manually adjusting electrical characteristics of a circuit comprises:
 a) a support housing;
 b) variable means disposed within said support housing for setting the electrical characteristics of said circuit;
 c) cam means, having a corrugated surface, fixed with respect to said support housing; and
 d) a linearly movable actuator slidably mounted on said support housing and positionable, by an applied force, in a plurality of discrete positions to adjust said variable setting means, said actuator comprising at least one cantilevered flexible member for engaging said corrugated surface and for urging said actuator into each of said positions.

In another embodiment of the present invention, a multi-pole, multi-throw linear switch for use in circuits carrying less than about 3A comprises:
 a) a switch housing;
 b) at least one array of linearly arranged terminals disposed within said switch housing; and
 c) a wiper assembly, including at least one conductive wiper, slidably retained within said switch housing and positionable, by an applied force, in a plurality of discrete positions to selectively engage two or more of said terminals with a contact force of less than about 0.2 lb. to provide a connection sufficient to conduct at least about 3A;
whereby sliding motion of said wiper assembly is characterized by substantially smooth displacement and low positioning force.

In another embodiment of the present invention, an apparatus for manually adjusting the speed of an electric motor comprises:
 a) a support housing;
 b) circuit means disposed within said support housing for variably controlling the amount of power provided from an ac source to said electric motor;
 c) a linearly movable actuator slidably mounted on said support housing and positionable in a plurality of discrete positions to adjust said control circuit; and
 d) detent means mechanically engaging said actuator to urge said actuator into each of said positions, the magnitude of said urging force being a maximum approximately half-way between adjacent positions and decreasing substantially linearly to a minimum at each of said positions.

In another embodiment of the present invention, an apparatus for variably controlling power from an ac source to an electric load comprises:
 a) a support housing;
 b) first and second capacitors disposed within said support housing;
 c) switch means, connected to said first and second capacitors, discretely positionable:
  i) in a first position to directly connect said ac source to said load,
  ii) in a second position to connect, in series with said load, said first and second capacitors in parallel,
  iii) in a third position to connect, in series with said load, said first capacitor, and
  iv) in a fourth position to connect, in series with said load, said first and second capacitors in series, so that each of said positions provides a discrete level of power from said source to said load; and
 d) a linearly movable actuator slidably counted on said support housing and operable to selectively position said switch means in each of said positions.

In another embodiment of the present invention, an apparatus for variably controlling power from an ac source to an electric load comprises:
 a) a support housing;
 b) first and second capacitors, of substantially equal value, disposed within said support housing;
 c) multi-position switch means, connected to said first and second capacitors, discretely positionable:
  i) in a first position to directly connect said ac source to said load,
  ii) in a second position to connect, in series with said load, said first and second capacitors in parallel,
  iii) in a third position to connect said first capacitor in series with said load, and
  iv) in a fourth position to disconnect said ac source from said load; and
 d) a linearly movable actuator slidably mounted on said support housing and operable, by an applied force, to selectively position said switch means in each of said positions.

In another embodiment of the present invention, an apparatus for manually adjusting the speed of an electric motor comprises:
 a) a support housing;
 b) variable circuit means, having only two power-carrying leads, disposed within said support housing for providing substantially smooth power from an ac source to said electric motor, so that it emits substantially no audible noise at frequencies above about 60 Hz;
 c) a movable actuator mounted on said support housing and positionable, by an applied force, in a plurality of discrete positions, to adjust said variable circuit; and
 d) switch means, connected in series with said ac source and said electric motor, operable to turn power to said motor off and on to a preset speed determined by the position of said actuator.

In another embodiment of the present invention, an apparatus for manually adjusting the speed of an electric motor and for independently controlling power from an ac source to a lighting load comprises:

a) a support housing;

b) variable circuit means disposed within said support housing for providing substantially smooth power from an ac source to said electric motor, so that it emits substantially no audible noise at frequencies above about 60 Hz;

c) a linearly movable actuator slidably mounted on said support housing and positionable, by an applied force, in a plurality of discrete positions, to adjust said variable circuit; and d) switch means, connected in series with said ac source and said lighting load, operable to turn power to said lighting load on and off;

whereby the speed of said fan and power to said lighting load are independently controllable.

In another embodiment of the present invention, an apparatus for manually adjusting the speed of an electric motor driven ceiling fan comprises:

a) a support plate having an elongated slot and a plurality of holes for mounting to an electrical wallbox;

b) a cradle, mounted on said support plate, having a snap retaining means;

c) a four-position linear slide switch retained by said snap retaining means;

d) first and second capacitors electrically connected to and mounted on either side of said slide switch; and e) an actuator, slidably retained by said cradle and extending through said elongated slot to selectively position said slide switch in each of a plurality of discrete positions to connect at least one of said capacitors in series with said electric motor.

DETAILED DESCRIPTION OF THE INVENTION

Figure 1:
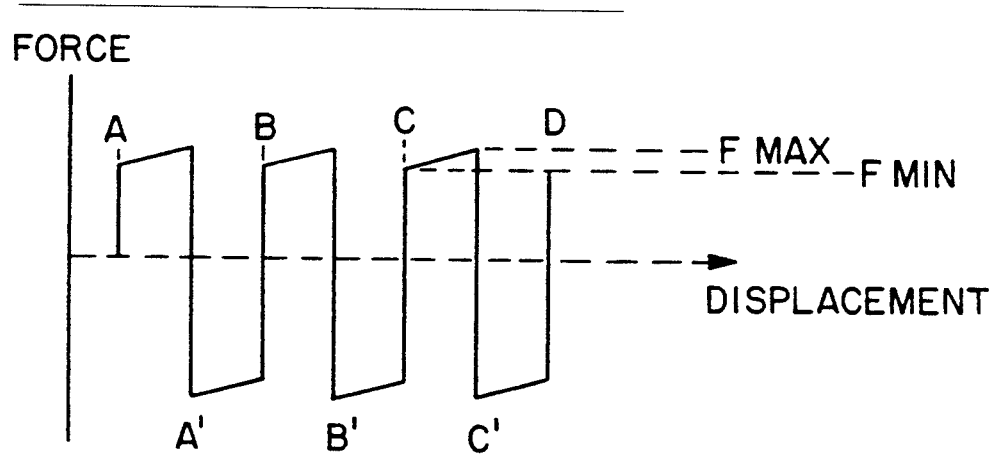
FIG. 1 shows the force vs. displacement characteristics of a linear switch and actuator of the present invention.

FIG. 1 shows the preferred force vs. displacement characteristics of a linear switch and actuator of the present invention. Positions A, B, C, and D correspond to discrete switch settings, which determine the electrical characteristics of an electrical circuit, such as a quiet fan speed control. Positions A', B', and C' correspond to switch settings that cause the switch to be inoperable. The force characteristics of the actuator are preferably selected to urge the switch into positions A, B, C, and D and away from positions A', B', and C'.

Consider that the actuator is initially at rest at position A. When the actuator is initially displaced, it exerts a resisting force $F_{min}$ urging the actuator back toward position A. As the actuator moves from position A toward position A', the resisting force increases linearly to a maximum force $F_{max}$ at position A'. If displaced further, the force reverses direction and urges the actuator toward position B. If a counter force is not applied to the actuator, it rapidly accelerates and quickly comes to rest at position B. The force characteristics are substantially similar between positions B and C, and C and D. The urging force that tends to detain the actuator in each of the positions A, B, C, and D, is referred to in this specification and the appended claims as a "detention step".

The maximum force $F_{max}$ required to move the actuator from one position to the next is preferably selected to be less than that which would cause overshoot (i.e., cause the actuator to move past a desired position) when operated by an extended arm. This force is determined by numerous characteristics of the human anatomy and varies from person to person, but a maximum force of about 0.8 lb. appears to achieve the preferred result. The minimum actuation force $F_{min}$ is selected so that the actuator cannot be easily displaced from positions A, B, C, and D. This minimum force is also preferably larger than any sliding friction forces which may act upon the actuator. A minimum force of about 0.5 lb. satisfactorily achieves these results. The actual measured force vs. displacement characteristics of a switch and actuator of the present invention may include hysteresis or discontinuities not shown in FIG. 1.

Figure 2:
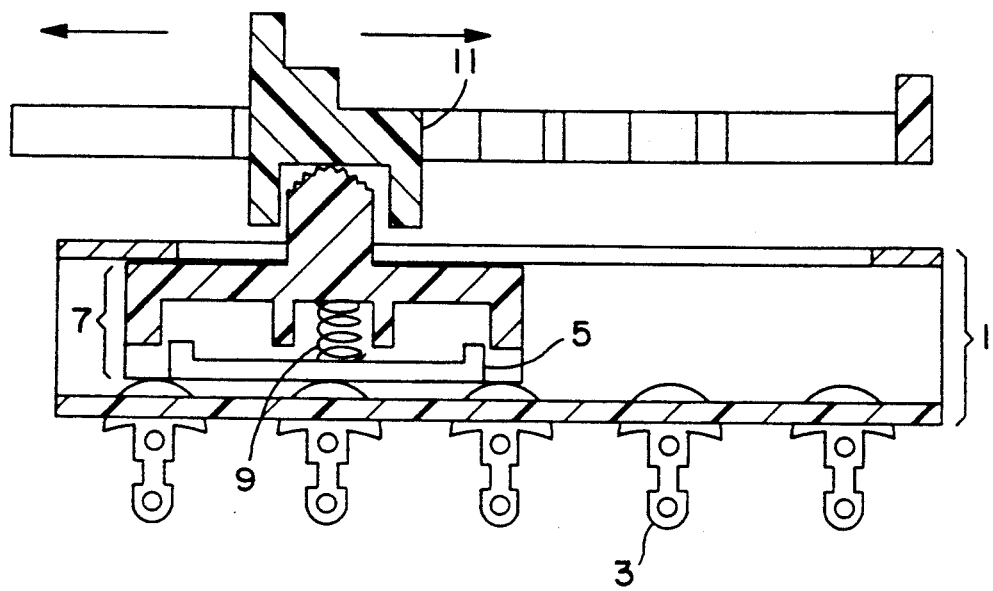
FIG. 2 is a front cross-sectional view of a switch and actuator of the present invention.

FIG. 2 is a front cross-sectional view of a switch and actuator of the present invention. The switch and actuator are symmetrical about the cross-sectional plane. Switch 1 is a double-pole, 4-throw linear slide switch that is capable of switching up to about 3A of current at 170 V peak voltage. The switch includes five pairs of terminals 3, aligned in an array. Adjacent pairs of terminals can be alternately connected to each other via parallel wipers 5 that slide along the terminal array. The wipers are resiliently mounted in wiper assembly 7 and are biased via corresponding springs 9 toward the terminals, so that they engage each terminal with a contact force of less than about 0.2 lb. The wiper assembly can be moved from one position to the next with a maximum applied force of less than about 0.2 lb. Actuator 11 engages wiper assembly 7 to selectively set it in any one of a number of switch setting positions.

Figure 3:
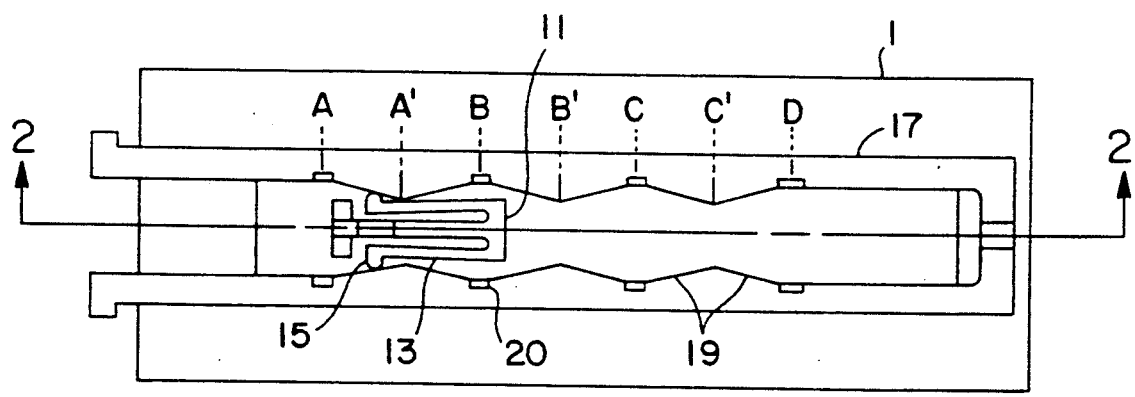
FIG. 3 is a top view of a switch and actuator of the present invention.

FIG. 3 is a top view of a switch and actuator of the present invention. Cantilevered members 13 extend from actuator 11 and include contact surfaces 15 that flexibly engage the corrugated surfaces of cam 17 which flank actuator 11.

The cam surfaces are characterized by sloping side walls 19 and notches 20. As actuator 11 is moved from left to right, each contact surface 15 follows the sloping side walls 19, of cam 17 deflecting each cantilevered member 13 toward the center line of actuator 11 and urging actuator 11 back toward position A. This deflecting force increases linearly to a maximum at position A'. Beyond this, it reverses direction and urges actuator 11 toward position B. Once at this position, contact surfaces 15 fall into corresponding notches 20, detaining actuator 11 from being moved further, unless a minimum actuation force ($F_{min}$ in FIG. 1) is applied. The switch and actuator operate similarly between positions B, C, and D.

Figure 4:
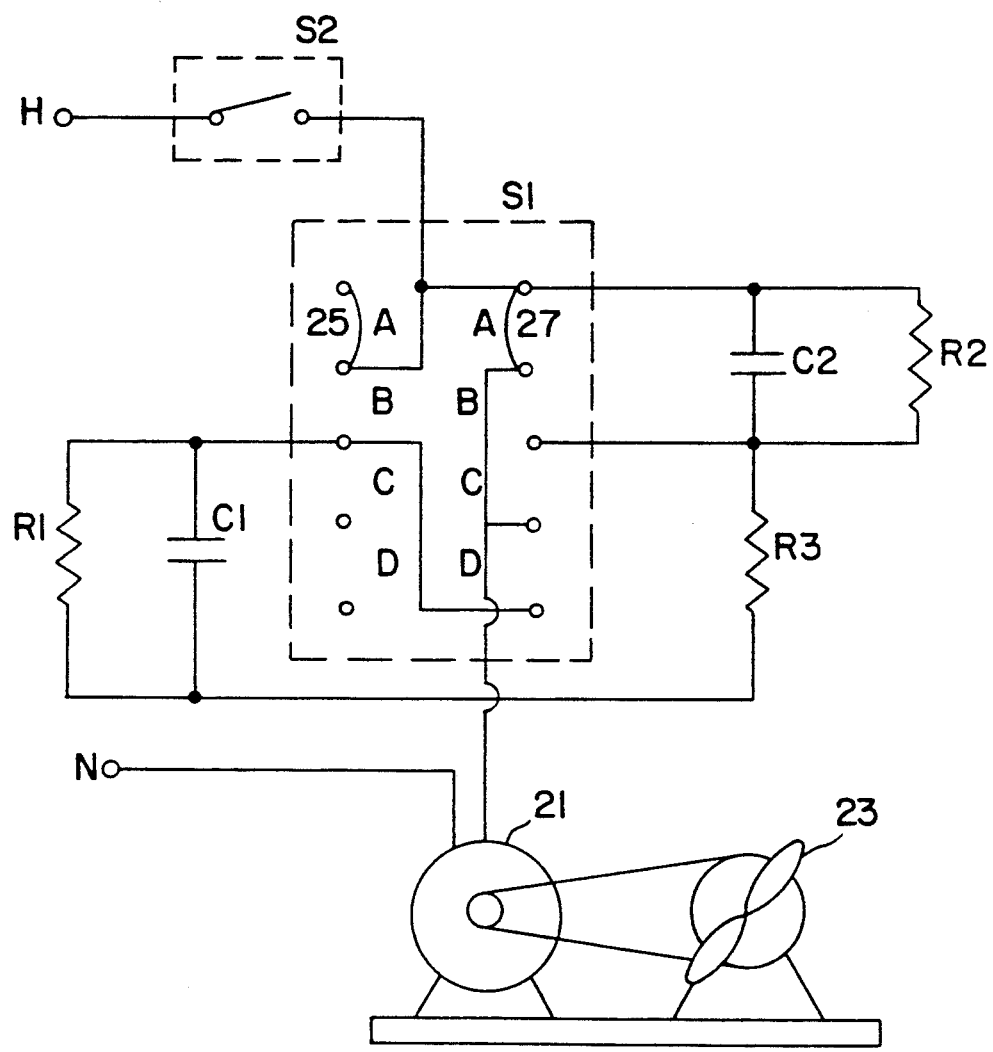
FIG. 4 is a circuit schematic of a four-speed quiet fan speed control of the present invention.

FIG. 4 is a circuit schematic of a four-speed quiet fan speed control of the present invention. Voltage, from hot (H) to neutral (N), is provided to electric fan motor 21 to drive fan 23. Capacitors C1 and C2 are preferably equal in value and can be switched, in various combinations, into series connection with electric motor 21 to limit the ac power to the motor. Parallel wipers 25 and 27 of double-pole, 4-throw switch S1 are linearly positionable: in position A to directly connect motor 21 across line voltage (H) to (N),(highest speed); in position B to connect, in series with motor 21, capacitors C1 and C2 in parallel (medium-high speed); in position C to connect capacitor C2 in series with motor 21 and to disconnect capacitor C1 (medium-low speed), and in position D to connect, in series with motor 21, capacitors C1 and C2 in series (lowest speed).

Switch S2 is preferably an alternate action push-switch and turns power to motor 21 off and on to a speed determined by the setting of switch S1. Resistors R1 and R2 are bleeders to discharge capacitors C1 and C2, respectively, when power is removed. Resistor R3 limits the instantaneous current required to balance the voltage on capacitors C1 and C2 when wipers 25 and 27 are initially moved to position B, connecting the capacitors in parallel.

Figure 5:
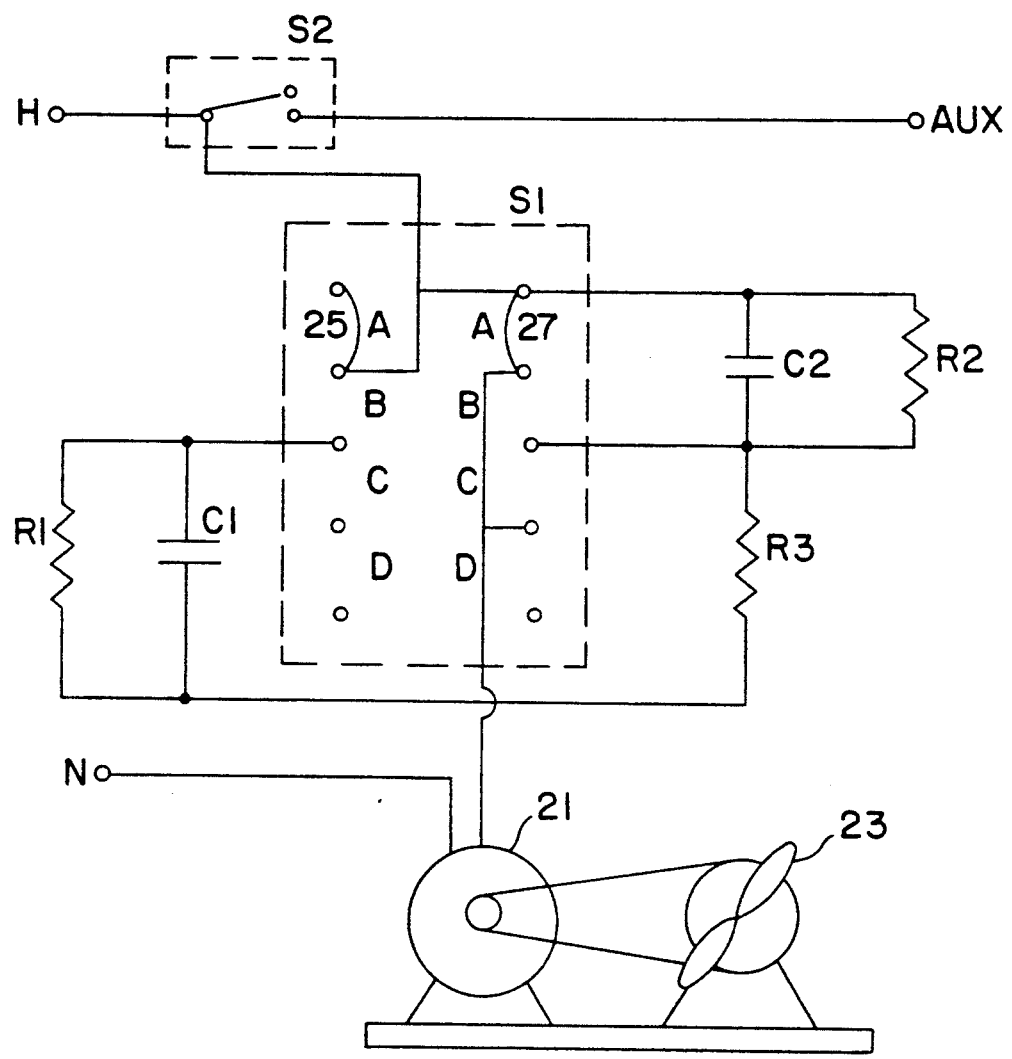
FIG. 5 is a circuit schematic of a three-speed quiet fan speed control of the present invention.

FIG. 5 is a circuit schematic of a three-speed quiet fan speed control of the present invention. Elements corresponding to those in FIG. 4 are identically labeled. The circuit operates similarly to the circuit of FIG. 4, except that when wipers 25 and 27 are in position D, power is disconnected from motor 21. Switch S2, instead of turning power on and off to the motor, as in FIG. 4, turns power on and off to an auxiliary load (not shown), such as a chandelier mounted below a ceiling fan.

Figure 6:
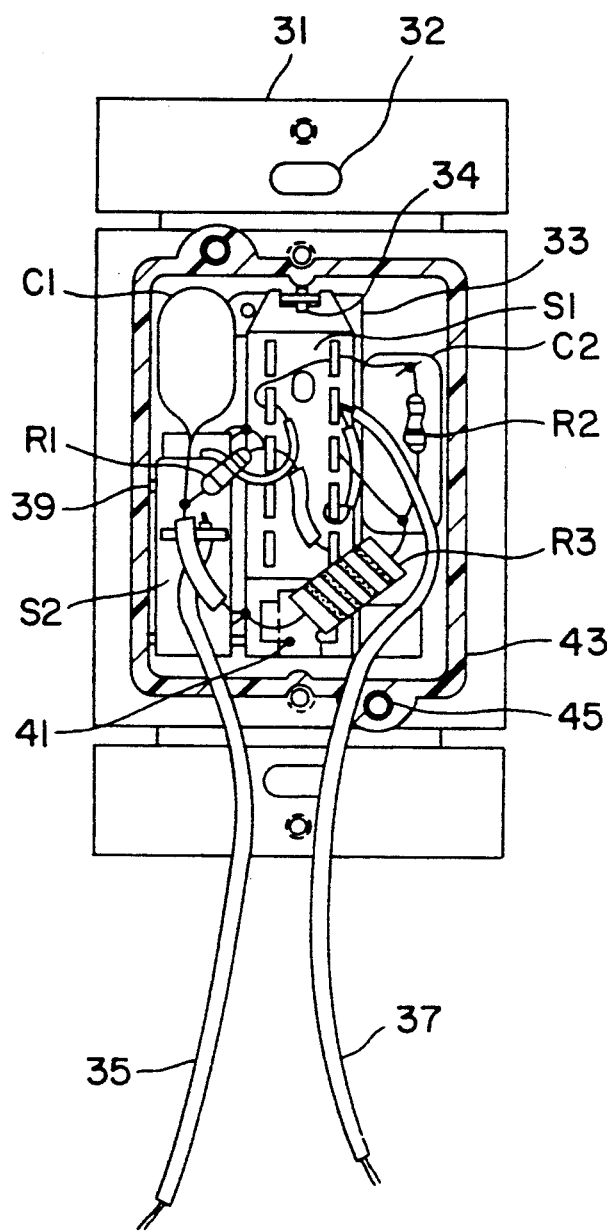
FIG. 6 is a rear view of a fan speed control of the present invention.

FIG. 6 is a rear view of a fan speed control of the present invention. Support plate 31 is attachable to a wall mounted electrical wallbox with screws inserted through elongated opening 32. Cradle 33, preferably injection molded of a flame retardant plastic, such as Valox ®, is attached to support plate 31 with eyelets, rivets, or other attachment devices well known in the art. Slide switch S1 is snap mounted to cradle 33 via snap retainer 34 so that the switch actuator (not shown) slidably protrudes through a slot (not shown) in support plate 31. Snap retainer 34 vertically extends from cradle 33 and has a toothed end for flexibly retaining the slide switch.

Capacitors C1 and C2, preferably of the metalized film type, are mounted on either side of switch S1 and are electrically connected to it to provide selectable impedance between power-carrying leads 35 and 37. Although the capacitors may be mounted on top of switch S1, side mounting is preferred since it reduces the height of the control circuit and makes more efficient use of the limited space available in the wallbox.

Lead 35 connects to hot (H) and lead 37 connects to one side of a motor armature winding (not shown). The power circuit is completed through a neutral wire connected to the other side of the armature winding. Quiet fan speed controls of the prior art require a third power-carrying lead connected to neutral; however, this is undesirable, since many electrical wallboxes have no neutral connection. The quiet fan speed control of the present invention requires only two power-carrying leads 35 and 37.

Resistors R1 and R2 are preferably ½ watt, relatively high impedance (>1 kΩ) carbon film resistors to bleed charge from capacitors C1 and C2, respectively, when power is removed from the circuit. Resistor R3 is preferably a 2 watt relatively low impedance (<100 Ω) plastic encapsulated carbon composite resistor to balance the voltage on capacitors C1 and C2.

Switch S2 is mounted to cradle 33 with support pins 39. Alternate-action latch 41 is mounted to cradle 33 adjacent to switch S2 to alternately latch switch S2 in the closed position. Alternatively, switch S2 and latch 41 may be combined to form an integral alternate-action latching switch.

Housing 43 mounts onto support plate 31 and encloses the speed control circuit to isolate the electrical components from ground potential and to prevent build-up of dust and other contaminants. Eyelets 45, or other fastening devices well known in the art, mechanically attach housing 43 to support plate 31.

In FIGS. 1, 2, and 3, the switch and actuator of the present invention are described in terms of adjusting the setting of a fan speed control. However, they can alternatively be used to adjust the electrical characteristics of any circuit. Likewise, a fan speed control of the present invention, such as shown in FIGS. 4, 5, and 6, can be used to control the speed of any type of electrically operated device.

Since certain changes may be made to the above described circuit and apparatus without departing from the scope of the invention herein involved, it is intended that all matter contained in the above description or shown in the accompanying drawings shall be interpreted in an illustrative and not a limiting sense.

We claim:

1. An apparatus for manually adjusting the speed of an electric motor driven ceiling fan, comprising:
    a) a support plate having an elongated slot and a plurality of holes for mounting to an electrical wallbox;
    b) a cradle, mounted on said support plate, having a snap retaining means;
    c) a four-position linear slide switch retained by said snap retaining means;
    d) first and second capacitors electrically connected to and mounted on either side of said slide switch; and
    e) an actuator, slidably retained by said cradle and extending through said elongated slot to selectively position said slide switch in each of a plurality of discrete positions to connect at least one of said capacitors in series with said electric motor.

2. The apparatus of claim 1 wherein said cradle is composed of an injection molded, flame retardant plastic.

3. The apparatus of claim 1 wherein said snap retaining means comprises a flexible cantilevered extension member having a toothed end for retaining said slide switch.

4. The apparatus of claim 1 wherein said slide switch comprises a double-pole, four-throw slide switch.

5. The apparatus of claim 1 wherein said capacitors are substantially equal in value.

6. The apparatus of claim 1 wherein said capacitors are of the metalized film type.

7. The apparatus of claim 1 wherein said slide switch is discretely positionable:
    a) in a first position to directly connect said ac source to said electric motor, said
    b) in a second position to connect, in series with electric motor, said first and second capacitors in parallel,
    c) in a third position to connect said first capacitor in series with said electric motor, and
    d) in a fourth position to connect, in series with said electric motor, said first and second capacitors in series, so that each of said positions provides a discrete level of power from said source to said load.

8. The apparatus of claim 1 further comprising detent means for mechanically engaging said switch actuator and urging it into each of said discrete positions.

9. The apparatus of claim 8 wherein said urging force is less than about 0.8 lb.

10. The apparatus of claim 1 further comprising a relatively low-resistance carbon composite resistor electrically connected between said first and second capacitors.

11. The apparatus of claim 1 further comprising first and second relatively high-resistance carbon film resistors electrically connected in parallel with said first and second capacitors, respectively.

12. The apparatus of claim 1 further comprising a second switch mounted to said cradle for connecting and disconnecting lower to said electric motor.

13. The apparatus of claim 12 wherein said second switch comprises an alternate action switch.

14. The apparatus of claim 1 further comprising a second switch mounted to said cradle for connecting and disconnecting power to an auxiliary load.

15. The apparatus of claim 14 wherein said second switch comprises an alternate action switch.

* * * * *